June 7, 1960   W. E. LEIBING   2,939,444
FUEL CONTROL MECHANISM
Filed March 7, 1956   3 Sheets-Sheet 2

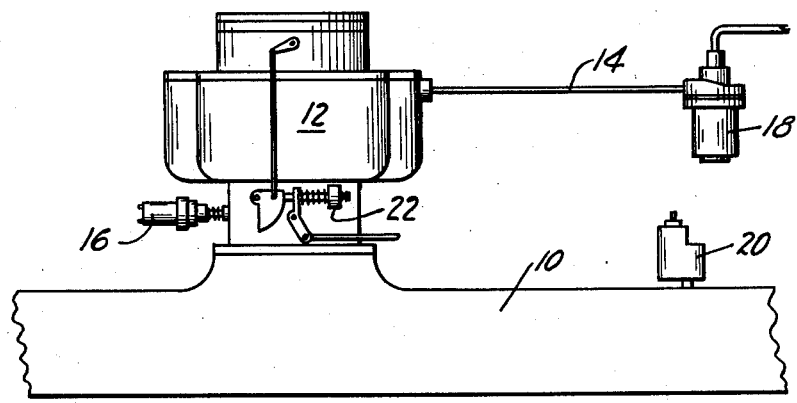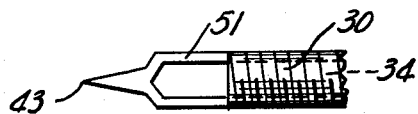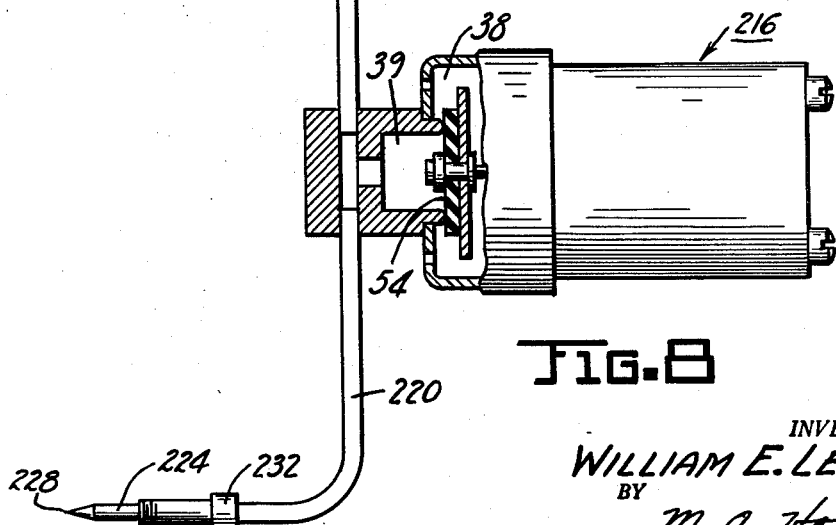

INVENTOR.
WILLIAM E. LEIBING
BY
M. A. Hobbs
ATTORNEY

June 7, 1960  W. E. LEIBING  2,939,444
FUEL CONTROL MECHANISM
Filed March 7, 1956  3 Sheets-Sheet 3

INVENTOR.
WILLIAM E. LEIBING
BY M. A. Hobbs
ATTORNEY

United States Patent Office 2,939,444
Patented June 7, 1960

2,939,444
FUEL CONTROL MECHANISM
William E. Leibing, Pasadena, Calif.
Filed Mar. 7, 1956, Ser. No. 570,187
15 Claims. (Cl. 123—97)

The present invention relates to an induction system of an internal combustion engine and more particularly to a fuel control mechanism for use in conjunction with said system.

The invention is primarily concerned with a device or system for preventing fumes from being discharged through the exhaust pipe of an automobile when said vehicle is coasting down grade or decelerating from a rather high rate of speed. During this deceleration or coasting, the vehicle usually drives the engine and, since the throttle valve of the carburetor is closed, the vacuum in the intake manifold rises substantially above that existing during normal engine idling, causing the compression ratio in the cylinders to fall from, for example, 8 to 1 to as low as 1.2 to 1. Charges formed under these conditions are small and often lean and thus fail to ignite at the low compression. The unignited charges are discharged from the cylinders through the exhaust pipe into the atmosphere as raw or partially burned fuel vapors, contributing seriously in some cities to the prevailing smog conditions. Further, in some instances the fumes are ignited in the exhaust pipe by the residual heat or the firing of subsequent charges in the cylinders, producing popping in the exhaust pipe and muffler.

Since engine operation is not necessary when the vehicle is driving the engine, the discharge of fumes has been prevented to a limited extent in the past by employing a device on or in conjunction with the carburetor for completely interrupting the operation of the idle system by shutting off the flow of fuel therethrough during the time the load is driving the engine. While this type of device has effectively eliminated the formation of lean charges from the idle fuel, unfireable charges are sometimes formed by fuel spilling into the induction passage from the main jet of the carburetor by the bouncing, tossing and jarring of the vehicle as it is decelerating or coasting. This is primarily caused by oscillation of the float in the fuel bowl opening the fuel inlet valve and admitting excess fuel and raising the level in the bowl to a point where the fuel flows through the main jet and spills intermittently into the induction passage. This spilling provides either excessively rich or excessively lean charges which do not fire in the cylinders and are discharged as fumes through the exhaust pipe into the atmosphere. It is therefore one of the principal objects of the present invention to provide a device or system which interrupts the flow of fuel from both the idle system and the main jet of the carburetor when the load is driving the engine such as to create an intake manifold vacuum in excess of that normally existing during engine idling.

Another object of the present invention is to provide an electrically operated device or system for shutting off the flow of fuel through the idle system of the carburetor and to or from the fuel bowl whenever the intake manifold vacuum reaches a predetermined degree above that existing at normal idling.

Another object of the invention is to provide an electrically operated device or system of the aforesaid type which can be connected readily into the electrical circuit of an automotive engine.

Still another object is to provide a relatively simple but effective degasser for internal combustion engines which is adapted to give long trouble-free operation and which can be readily serviced and repaired if operation failure occurs.

A further object of the invention is to provide a device for interrupting the flow of fuel to the fuel bowl of a float type carburetor whenever the manifold vacuum reaches a predetermined degree.

Another object of the invention is to provide a means for preventing the discharge of fuel from the main discharge system of a carburetor when the vehicle is driving the engine.

Additional objects and advantages of the present invention will become apparent from the following description and accompanying drawings, wherein:

Figure 1 is an elevational view of an intake manifold, carburetor and my degasser system, showing the various units comprising the system mounted in operative position with relation to the manifold and carburetor;

Figure 5 is a cross sectional view of a vacuum responsive switch for controlling the operation of the system.

Figure 8 is a partial cross sectional view of a modified form of the idle cut-off mechanism.

My degasser system consists principally of a unit for shutting off the flow of fuel from the idle system of the carburetor, a unit in the main fuel line to the carburetor for shutting off the fuel flow to the fuel bowl, and a unit for controlling the vacuum operating the first two units of the system. The present mechanism is a modified form of the basic invention disclosed and claimed in my co-pending application Serial No. 557,789 filed January 6, 1956, now U.S. Pat. No. 2,848,202. In the present specification and claims, as in the prior application, the word "degasser" is used to apply to mechanisms or systems for interrupting the flow of fuel to the engine, particularly from the carburetor idle system and main jet, while the vehicle is coasting down grade or decelerating, i.e. while the load is driving the engine.

Referring more specifically to the drawings, numeral 10 designates a conventional manifold for an internal combustion engine, 12 a carburetor mounted on said manifold, 14 a fuel line connecting the carburetor with a source of fuel, 16 an electrically operated unit mounted on the carburetor for shutting off the flow of fuel from the idle system, 18 an electrically operated valve unit in the fuel line, and 20 a vacuum responsive unit mounted on the manifold for controlling the operation of units 16 and 18. A switch 22 operated in conjunction with the throttle valve prevents operation of the degasser system except when the throttle valve is in closed or substantially closed position.

Figure 2:
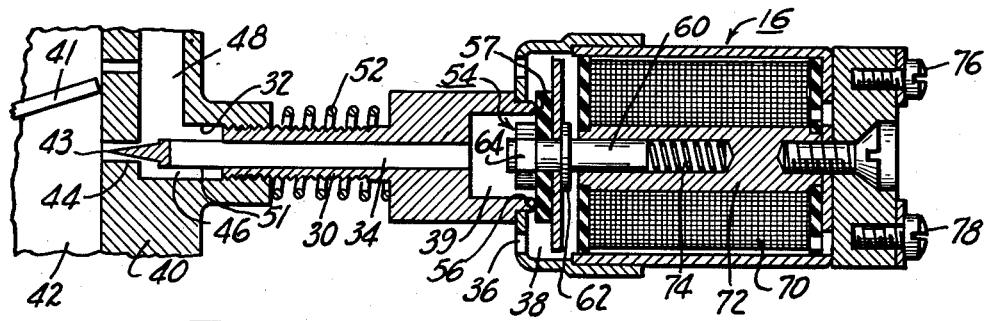
Figure 2 is a cross sectional view of the unit for controlling the idle system of the carburetor when my system is in operation.
Figure 3:
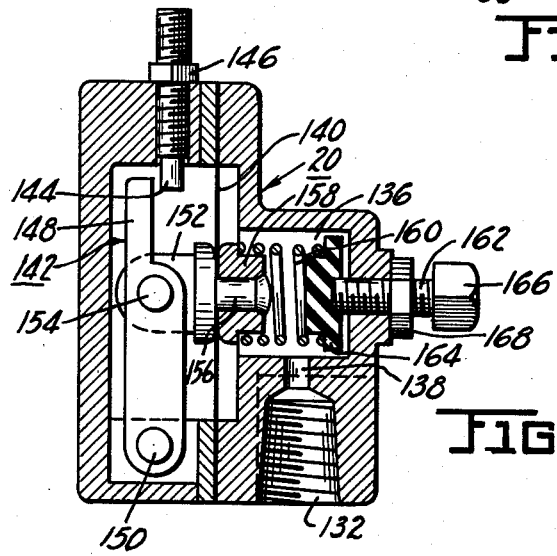
Figure 3 is a fragmentary view of a portion of the unit shown in Figure 2.

Unit 16 of Figure 2 is provided with a stem 30 having a threaded portion for screwing into the threaded bore 32 of the idle adjustment screw of the standard carburetor and containing a central passage 34 through which air is adapted to flow from the atmosphere through holes 36 and chambers 38 and 39. A portion of the carburetor throttle body, throttle and induction passage are shown at numerals 40, 41 and 42, respectively. Stem 30 terminates in a conical point 43 which in cooperation with seat 44 serves as an idle adjustment valve, the opening between said conical tip and said seat being adjusted by the rotation of stem 30 in or out of the bore 32. Passage 34 is connected directly to a chamber 46 of the idle system 48 of the carburetor, by milling the side walls of the stem away, as shown at numeral 51 in Figures 2 and 3, to expose said passage. In making an adjustment of point 43 relative to seat 44 the entire unit 16 is rotated and the desired setting of said point is maintained by a spring 52 around stem 30 bearing against the idle screw boss and a shoulder on stem 30. A valve 54 is provided at the entrance of passage 34 and consists of an annular valve seat 56 and a disc shaped gasket 57 carried by a stem 60 and fixed plate 62 and secured thereto by a nut 64 which clamps the gasket against said plate. Gasket 57 is moved from its seat by a solenoid 70 having a partially hollow core 72 in which stem 60 is adapted to reciprocate. The stem is moved in the right hand direction by the solenoid to remove gasket 57 from its seat and is moved in the left hand direction to seat the gasket by a spring 74 disposed in the hollow interior of the core. Terminals 76 and 78 connect the solenoid to the control circuit of the degasser system.

Figure 4:
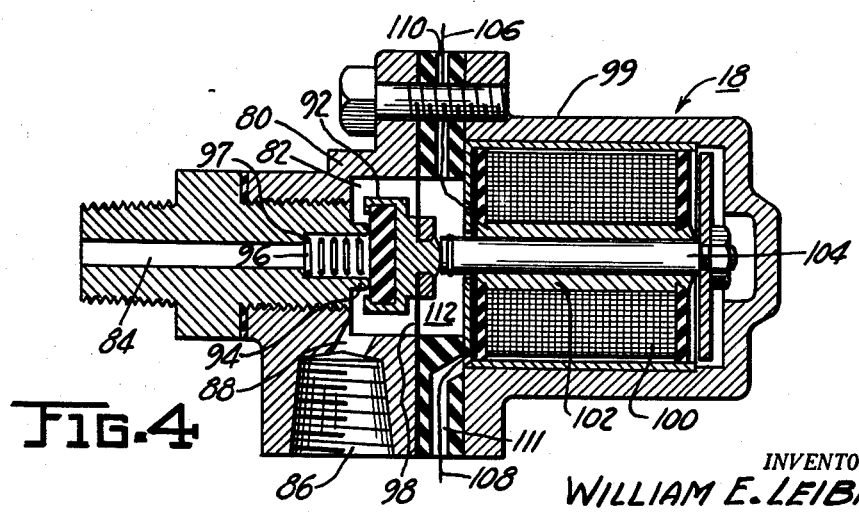
Figure 4 is a cross sectional view of the unit for controlling the main fuel supply to the carburetor when my system is in operation.

Valve unit 18 of Figure 4 consists of a housing 80 and a valve chamber 82 connected by a passage 84 with the fuel supply line from the fuel pump and connected by passages 86 and 88 with the fuel line leading to the carburetor. A movable valve member 92 in cooperation with annular valve seat 94 controls the flow of fuel to the carburetor and is urged to its open position by a spring 96 reacting between valve member 92 and an annular shoulder 97 in passage 84. A diaphragm 98 forms one wall of chamber 82 and is adapted to seal said chamber from the electrical valve actuating means 99. Valve member 92 is moved to its seat by a solenoid 100 having a core 102 in which a stem 104 reciprocates, said stem being moved toward the left by the solenoid to close the valve and toward the right by spring 96 to open the valve. The lead-in wires 106 and 108 for the solenoid pass through holes 110 and 111, respectively, and 106 through chamber 112 between diaphragm 98 and the end of the solenoid.

The vacuum responsive unit 20 of Figure 5 is connected to the intake manifold by a tube threadedly received in opening 132 and contains a chamber 136 connected to said opening by a passage 138. A diaphragm 140 forms one wall of chamber 136 and is operatively connected to an electrical switch 142 consisting of a stationary contact 144 connected to terminal 146, and a movable contact 148 pivotally connected to a terminal (not shown) by a pin 150. Contact 148 is operated by the diaphragm through a stem 152 connected to said contact by a pin 154 and to the diaphragm by a rivet 156 and washer 158. The diaphragm is urged in the direction to open the switch by a spring 160 which reacts between washer 158 and a spring adjustment mechanism 162 consisting of a spring retainer 164 movably supported by a screw 166 threadedly received in a hole in the side wall of the unit. A nut 168 is provided to secure the screw in place once a setting has been made. Spring 160 is set to resist the effect of manifold vacuum transmitted to chamber 136 until said vacuum increases to a predetermined point substantially above that existing at normal idling. Spring retainer 164 is constructed of fiber or other electrical non-conducting material to prevent contact 148 from being grounded except through pin 150.

Figure 6:
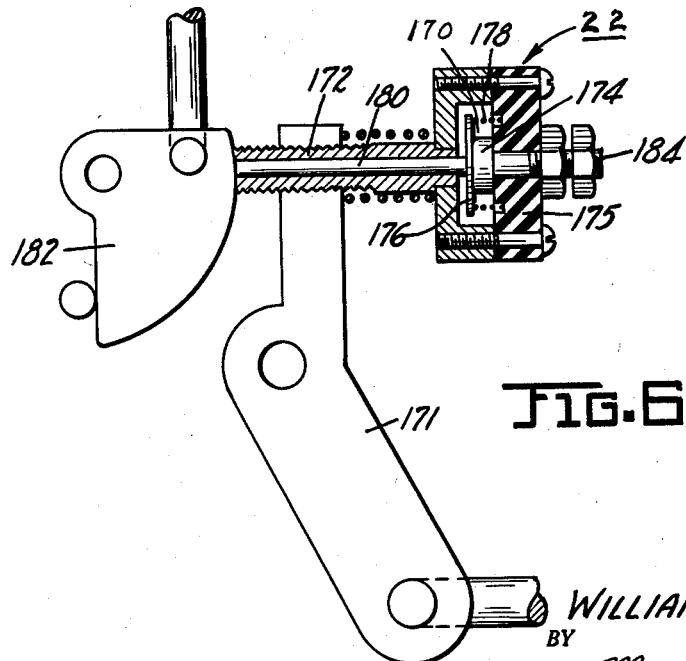
Figure 6 is a cross sectional view of a switch mechanism for controlling my system in response to operation of the carburetor throttle valve.

A mechanically actuated switch 170 of switch unit 22, shown in Figure 6, is mounted on the throttle valve lever 171 of the carburetor and is provided with a stem 172 which is threaded into said lever and becomes the idle speed adjusting screw. The switch consists of a stationary contact 174 mounted in a non-conducting plate 175 and a movable contact 176 actuated in the direction to open the switch by a spring 178 and in the direction to close the switch by a rod 180 adapted to contact the fast idle cam 182, or other stop member, for the throttle lever. When the throttle lever has been moved to a position wherein the throttle is at least partially open, rod 180 is moved to its far left position by spring 178 such that contact 176 is spaced from contact 174 and the left hand end of rod 180 projects beyond the end of stem 172. When the throttle lever is moved to idle position rod 180 contacts the cam or stop and is moved in the right hand direction until contacts 174 and 176 are closed. Contact 174 is connected to a terminal 184 and contact 176 is grounded through the switch housing and throttle lever.

Figure 7:
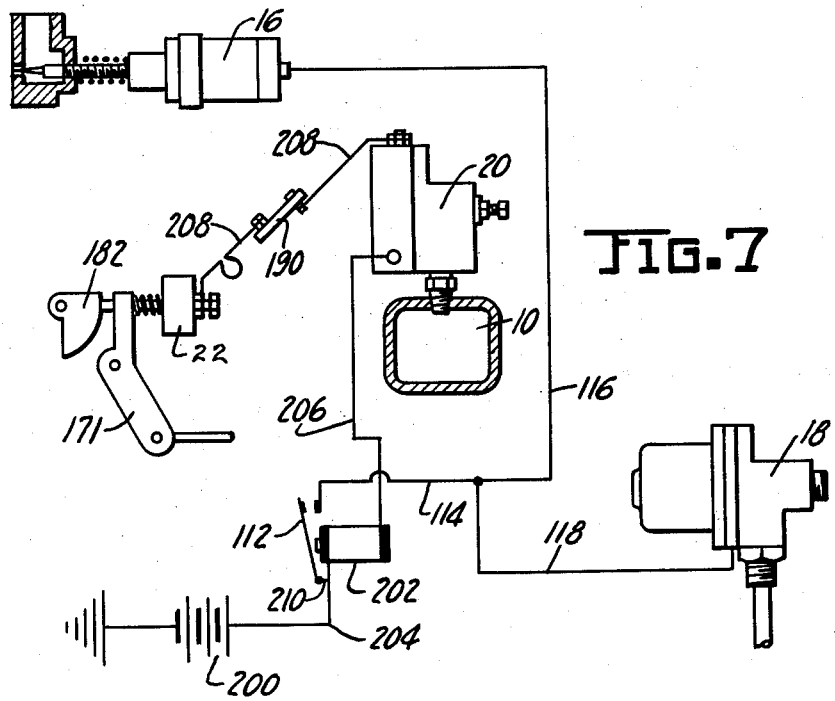
Figure 7 is a diagrammatical view of the electrical circuitry of my degasser system.

A temperature responsive switch 190, Figure 7, is preferably included in the system since some engines may stall or fail to restart after deceleration with the system in operation when the engine is cold. Switch 190 consists of a conventional bimetallic thermostatic switch mounted on the engine either on the exhaust manifold or in the water jacket.

The circuitry for my degasser system is shown diagrammatically in Figure 7 and includes a high amperage circuit controlled by a low amperage circuit. The low amperage circuit consists of a battery 200, relay 202, lead 204 connecting said battery and relay, lead 206 connecting the relay with vacuum responsive switch unit 20, and lead 208 connecting switch unit 20 with mechanically actuated switch 170 in which one terminal is grounded. The thermostatic switch 190 is preferably inserted in lead 208. The high amperage circuit consists of leads 204 and 210 connecting the battery with the relay switch 112, leads 114 and 116 connecting the relay switch with the solenoid of idle cut off unit 16, and leads 114 and 118 connecting the relay switch with the fuel line cut off unit 18. The circuits for units 16 and 18 are grounded as is battery 200.

During normal operation of the engine my degasser system has no effect on the operation of the engine. When, however, the vehicle is coasting down grade or decelerating rapidly from at least a moderate speed, the vehicle drives the engine causing the intake manifold vacuum to rise substantially above that normally existing at idling. This higher manifold vacuum is transmitted to chamber 136 of unit 20 where it causes diaphragm 140 to move to the right sufficiently to close switch 142. The degasser system however will not respond unless the temperature of the engine is sufficiently high to have closed thermostatic switch 190 and the throttle valve has been moved to idle position, i.e. the throttle lever has been moved to the position where stem 172 has contacted fast idle cam 182 and closed switch 170. If switches 170 and 190 are closed when switch 142 is closed by the high manifold vacuum, relay switch 112 closes, completing the circuit for energizing solenoids 70 and 100 of units 16 and 18, respectively. When solenoid 70 is energized valve 57 is opened, permitting air to flow through holes 36, chambers 38 and 39 and through passage 34 into the idle system where it replaces the fuel normally supplied by the idle system, and thus stops the flow of fuel through said system. When solenoid 100 is energized stem 104 is moved to the left sufficiently to move valve member 92 to its fully closed position, thereby interrupting the flow of fuel through the main fuel supply line to the carburetor. As deceleration or coasting ends the manifold vacuum returns to normal permitting spring 160 of unit 20 to open switch 142. Opening of this switch de-energizes relay 202 and breaks the circuit to units 16 and 18 to reestablish normal operation in the idle system and normal fuel delivery through the main fuel line to the carburetor.

Some carburetors, particularly the two and four barrel types, have only a very limited amount of space around the idle screw bosses in which units 16 can be mounted.

Also, most two and four barrel carburetors have two independent idle systems with separate idle adjustment screws, and for effective operation of any degasser system both idle systems must be rendered inoperative. In order to avoid the necessity of using a separate unit 16 for each idle system and/or to reduce the size of the elements attached directly to the carburetor, the unit 216 shown in Figure 8 may be employed. This unit is the same as unit 16 with the exception that stem 30 of unit 16 has been replaced by tubes 218 and 220 which connect unit 216 with the two idle systems of a double barrel carburetor. These tubes are provided with tips 222 and 224 similar to the tip on the end of stem 30, including conical points 226 and 228 which in cooperation with seats 44 serve as idle adjustment valves. Couplings 230 and 232 are provided between tubes 218 and 220 and their respective tips to permit said tips to be threaded into the idle screw bores and thereafter adjusted to give the proper clearance between the conical points and seats 44. When the solenoid in unit 216 opens valve 54, air bleeds through chambers 38 and 39 and both tubes 218 and 220 into tips 222 and 224 and interrupts the flow of fuel through the respective idle systems.

Unit 216 can readily be adapted to a carburetor having a single idle system, or to a plurality of separate carburetors having one or more independent idle systems, or to a carburetor having two or more idle systems, by merely providing a connection between unit 216 and each idle system for bleeding air into said systems when the degasser system is energized to thereby interrupt the flow of fuel from the idle systems. Unit 216 can be vacuum actuated and incorporated in the system disclosed in my above mentioned co-pending application.

While units 16, 18 and 20 are shown and described herein as separate units, two or all three units can, if desired, be combined into a single unit. Unit 216 described in the preceding paragraph is particularly adapted to this type of construction. For example, as an integral unit, a single solenoid, such as solenoid 70, can operate valve 54 to control air flow to the idle systems and simultaneously operate valve 92 to control the flow of fuel in the main fuel line. Further, valve 54 can be combined with unit 20 and controlled directly by diaphragm 140 as the latter simultaneously actuates switch 142. If the three units are combined into a single device, the device is preferably mounted in the fuel line and then connected by suitable tubing with the manifold for the vacuum control and to the various carburetor idle systems to control the flow of fuel therein.

In some installations it may be desirable to modify unit 16 so that solenoid 70 operates a valve which positively cuts off the flow of fuel through the idle systems instead of controlling an air bleed passage for the idle system. Also, unit 18 may be incorporated in the carburetor to positively shut off the flow of fuel through the main discharge jet. Further changes, modifications and rearrangements can be made in my degasser system without departing from the scope of the present invention.

I claim:

1. A degasser for an internal combustion engine having an intake manifold, a carburetor including an idle system, and a fuel supply line, comprising a valve for interrupting the flow of fuel from said idle system, a solenoid for operating said valve, a valve for interrupting the flow of fuel through said supply line, a solenoid for operating said valve, an electrical circuit including an electrical switch for controlling said solenoids, and a means for closing said switch when the manifold vacuum reaches a predetermined degree above that existing at normal idling, whereby the fuel flow in said fuel line and from said idle system is interrupted when the manifold vacuum reaches said predetermined degree.

2. A degasser for an internal combustion engine having an intake manifold, a carburetor with an idle system on said manifold, and a fuel supply line for said carburetor, comprising a passage for bleeding air into said idle system, a valve means for said passage, a solenoid for operating said valve means, a valve means in said fuel line, a solenoid for operating said last mentioned valve means, and a means including an electrical circuit for energizing said solenoids when the manifold vacuum reaches a predetermined degree above that existing at normal idling, whereby the fuel flow in said line and from said idle system is interrupted when the manifold vacuum reaches said predetermined degree.

3. A degasser for an internal combustion engine having an intake manifold, a carburetor including an idle system and a main discharge jet, comprising a valve means for interrupting the flow of fuel from said idle system, a valve means for interrupting the flow of fuel from said discharge jet, an electrical means for operating both of said valve means, an electrical circuit including a switch for controlling said electrical means, and a vacuum responsive means for closing said switch when the manifold vacuum reaches a predetermined degree above that existing at normal idling, whereby the fuel flow from said jet and from said idle system is interrupted when the manifold vacuum reaches said predetermined degree.

4. A fuel control mechanism for an internal combustion engine having an intake manifold, a carburetor with an idle system, and a fuel supply line for said carburetor, comprising a valve for controlling the flow of fuel through said idle system, an electrical means for operating said valve, a valve for controlling the flow of fuel through said fuel line, an electrical means for operating said valve, and an electrical circuit including a mechanism responsive to manifold vacuum for controlling both of said electrical means.

5. A fuel control mechanism for an internal combustion engine having an intake manifold, a carburetor with an idle system, and a fuel supply for said carburetor, comprising a passage for bleeding air into said idle system, a valve for controlling said passage, an electrical means for operating said valve, a valve for controlling the flow of fuel through said fuel line, an electrical means for operating said valve, and a means including an electrical circuit with a switch responsive to manifold vacuum for controlling both of said electrical means, 6. In a fuel control system for use in conjunction with a plurality of carburetor idle systems, a needle valve for each of said idle systems, a passage in said valves communicating with the idle systems, tubes connected with said passages for supplying air thereto, and a valve for controlling the flow of air through said tubes.

7. In a fuel control system for use in conjunction with a plurality of carburetor idle systems, a needle valve for each of said idle systems, a passage in said valves communicating with the idle systems, tubes connected with said passages for supplying air thereto, a valve for controlling the flow of air through said tubes, a means for operating said valve, and a vacuum responsive mechanism for controlling said first mentioned means.

8. In a fuel control system for use in conjunction with a plurality of carburetor idle systems, a needle valve for each of said idle systems, a passage in said valves communicating with the idle systems, tubes connected with said passages for supplying air thereto, a valve for controlling the flow of air through said tubes, an electrical means for operating said valve, and an electrical circuit including a vacuum actuated switch for controlling said electrical means.

9. In a fuel control system for use in conjunction with a plurality of carburetor idle systems, a needle valve for each of said idle systems, a passage in said valves communicating with the idle systems, tubes connected with said passages for supplying air thereto, an electrical means for operating said valve, an electrical circuit including a switch for controlling said electrical means, and a vacuum responsive means for closing said switch when the manifold vacuum reaches a predetermined degree above that existing at normal idling.

10. A fuel control mechanism for an internal combustion engine having an intake manifold, a carburetor with an idle system, and a fuel supply line for said carburetor, comprising a valve for controlling the flow of fuel through said idle system, a means for operating said valve, a valve for controlling the flow of fuel through said fuel line, a means for operating said valve, a means responsive to manifold vacuum for controlling both of said means, and a means responsive to engine temperature to render said mechanism inoperable while the engine is cold.

11. A fuel control mechanism for an internal combustion engine having an intake manifold, a carburetor with an idle system, and a fuel supply line for said carburetor, comprising a passage for bleeding air into said idle system, a valve for controlling said passage, an electrical means for operating said valve, a valve for controlling the flow of fuel through said fuel line, an electrical means for operating said valve, a means including an electrical circuit with a switch responsive to manifold vacuum for controlling both of said electrical means, and a means responsive to engine temperature to render said mechanism inoperable while the engine is cold.

12. A degasser for an internal combustion engine having an intake manifold, a carburetor including an idle system and a main discharge jet, comprising a valve means for interrupting the flow of fuel from said idle system, a valve means for interrupting the flow of fuel from said discharge jet, an electrical means for operating both of said valve means, an electrical circuit including a switch for controlling said electrical means, a vacuum responsive means for closing said switch when the manifold vacuum reaches a predetermined degree above that existing at normal idling, whereby the fuel flow from said jet and from said idle system is interrupted when the manifold vacuum reaches said predetermined degree, and a means responsive to engine temperature to render said degasser inoperable while the engine is cold.

13. A fuel system for controlling the flow of fuel to an engine through the carburetor system having a float valve controlled float chamber and an idling jet, the system comprising a first valve positioned in the fuel flow line to the carburetor float chamber, a second valve positioned to control the flow of fuel from the carburetor idling jet, and deceleration responsive means responsive to the engine being decelerated operatively connected to the first valve to operate it and terminate the flow of fuel to the float chamber and prevent flooding due to vibration of the engine and float valve, said deceleration responsive means operatively connected to the second valve and operative to terminate the flow of fuel through the idle valve when the engine is decelerated to avoid using fuel during deceleration.

14. A fuel system for controlling the flow of fuel to an engine through the carburetor system having a float valve controlled float valve chamber, the system comprising an electrically controlled valve connected to control the flow of fuel to the float chamber, deceleration responsive means responsive to the engine being decelerated, and switch means connected in a circuit to the electrically controlled valve and operated by the deceleration responsive means to operate the valve on deceleration of the engine and terminate the flow of fuel to the float chamber during deceleration to prevent overflow of the chamber from vibration of the float valve by the engine during deceleration.

15. A fuel system for controlling the flow of fuel to an engine through a carburetor system wherein the carburetor is supplied from a float chamber having a float valve, the system comprising a fuel valve positioned in the fuel flow line to control the flow to the carburetor float chamber, a deceleration responsive means for the engine responsive to the engine being decelerated and operatively connected to said fuel valve, and means connecting the deceleration responsive means to the fuel valve to automatically close the valve and terminate the flow of fuel to the float chamber when the engine is decelerating to prevent the flooding due to vibration of the engine and of the float valve of the float chamber.

References Cited in the file of this patent
UNITED STATES PATENTS

| | | |
|---|---|---|
| 2,035,775 | Vander Veer | Mar. 31, 1936 |
| 2,386,340 | Olson | Oct. 9, 1945 |
| 2,443,562 | Heiger et al. | June 15, 1948 |
| 2,556,405 | Troy | June 12, 1951 |
| 2,674,443 | Bracke | Apr. 6, 1954 |
| 2,715,420 | Stearns | Aug. 16, 1955 |
| 2,724,375 | Schaffer | Nov. 22, 1955 |
| 2,749,894 | Sariti et al. | June 12, 1956 |